Oct. 28, 1941.　　　J. A. RANASEY　　　2,260,481
AIRCRAFT CONSTRUCTION
Filed Oct. 21, 1939　　　4 Sheets-Sheet 1
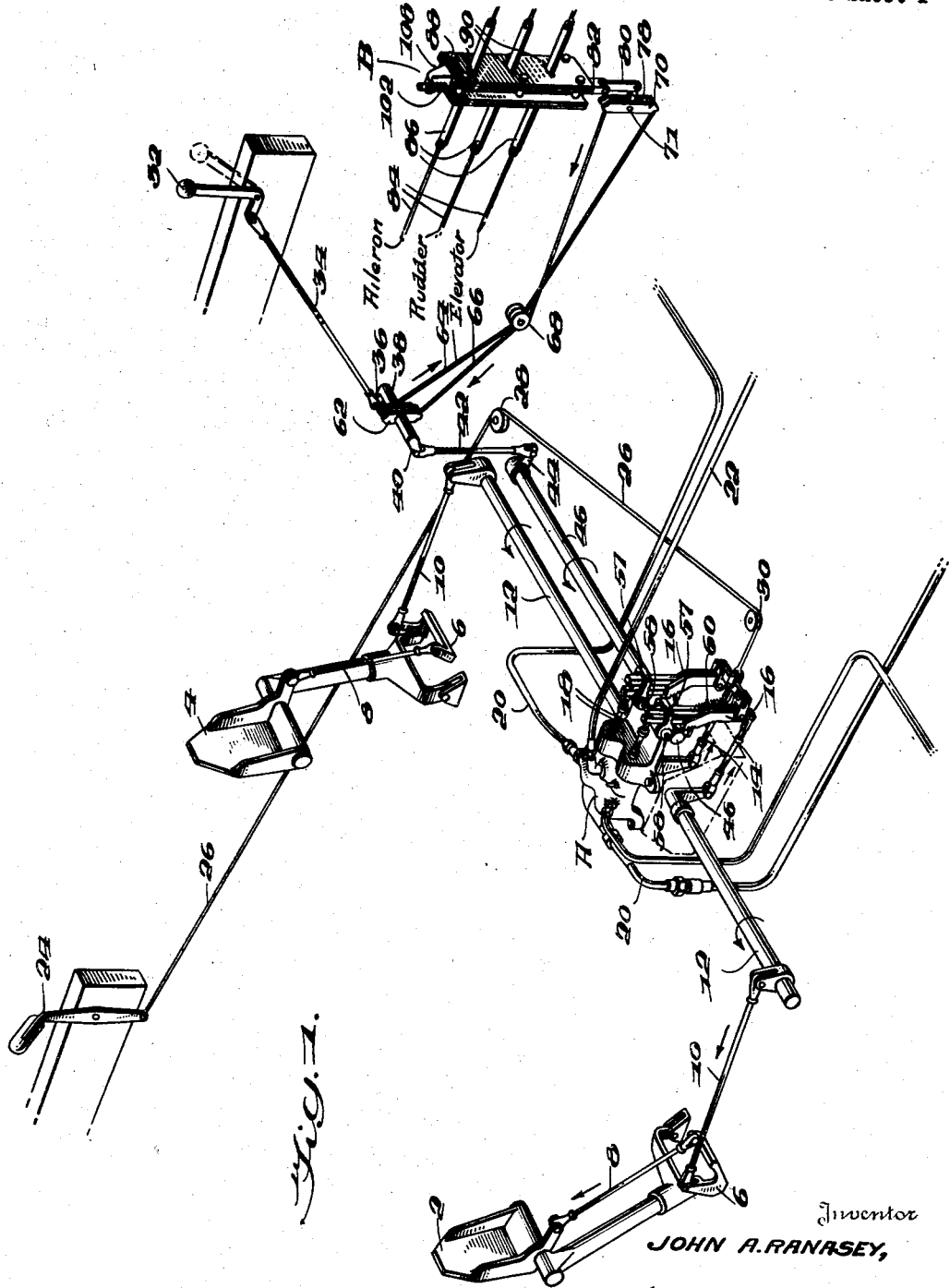
Inventor
JOHN A. RANASEY,
By Hairman Bates
Attorney Oct. 28, 1941.    J. A. RANASEY    2,260,481
AIRCRAFT CONSTRUCTION
Filed Oct. 21, 1939    4 Sheets-Sheet 2
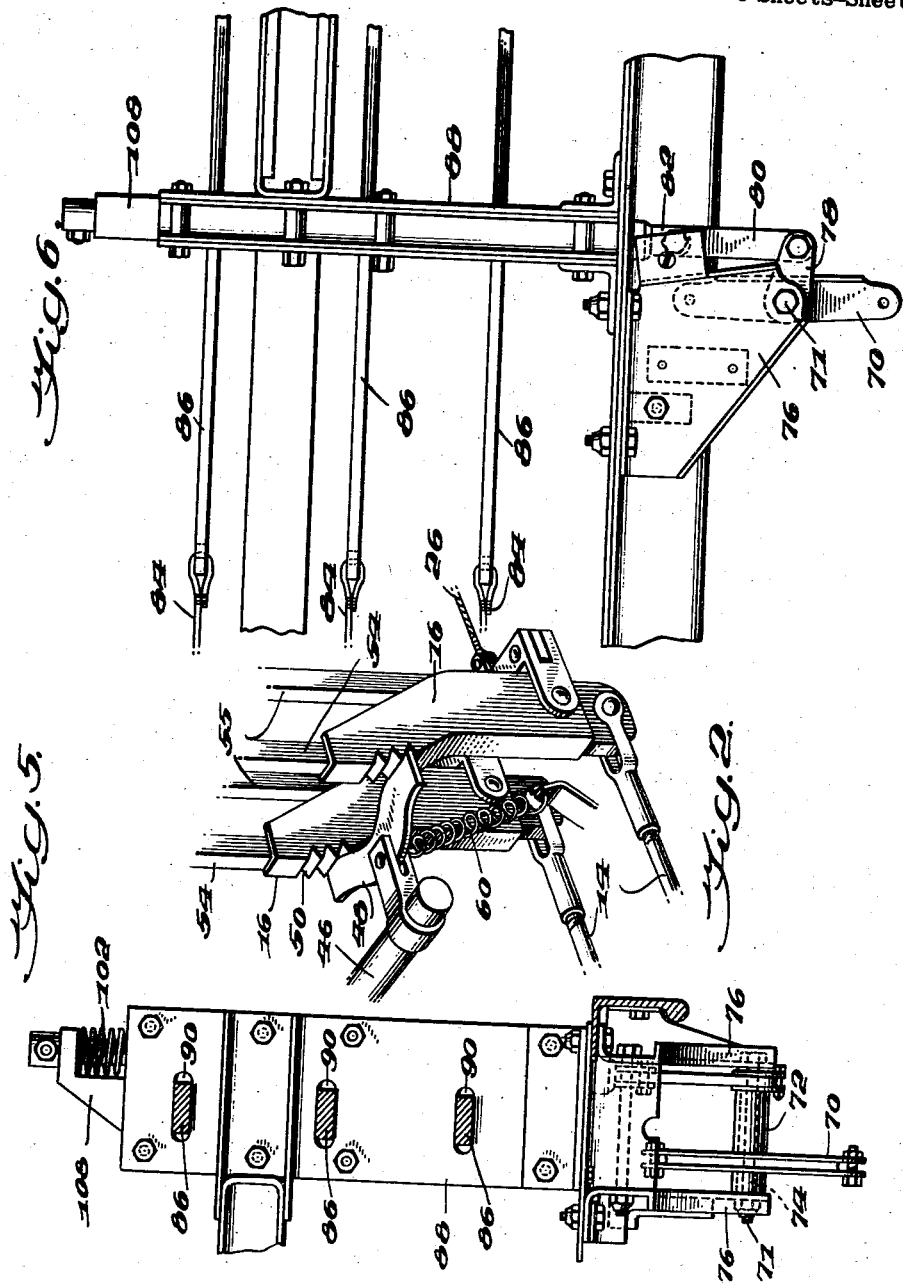
Inventor
JOHN A. RANASEY

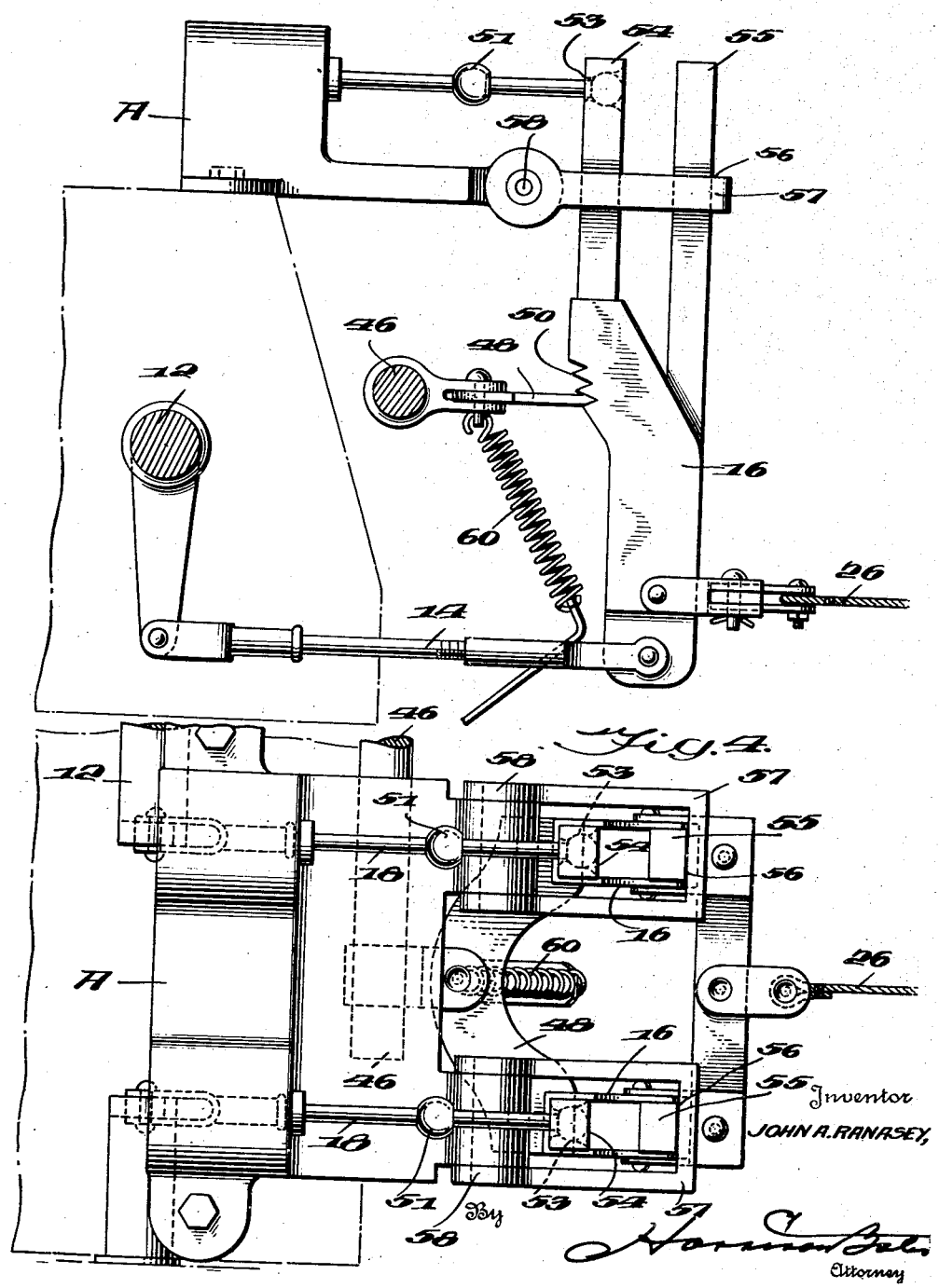

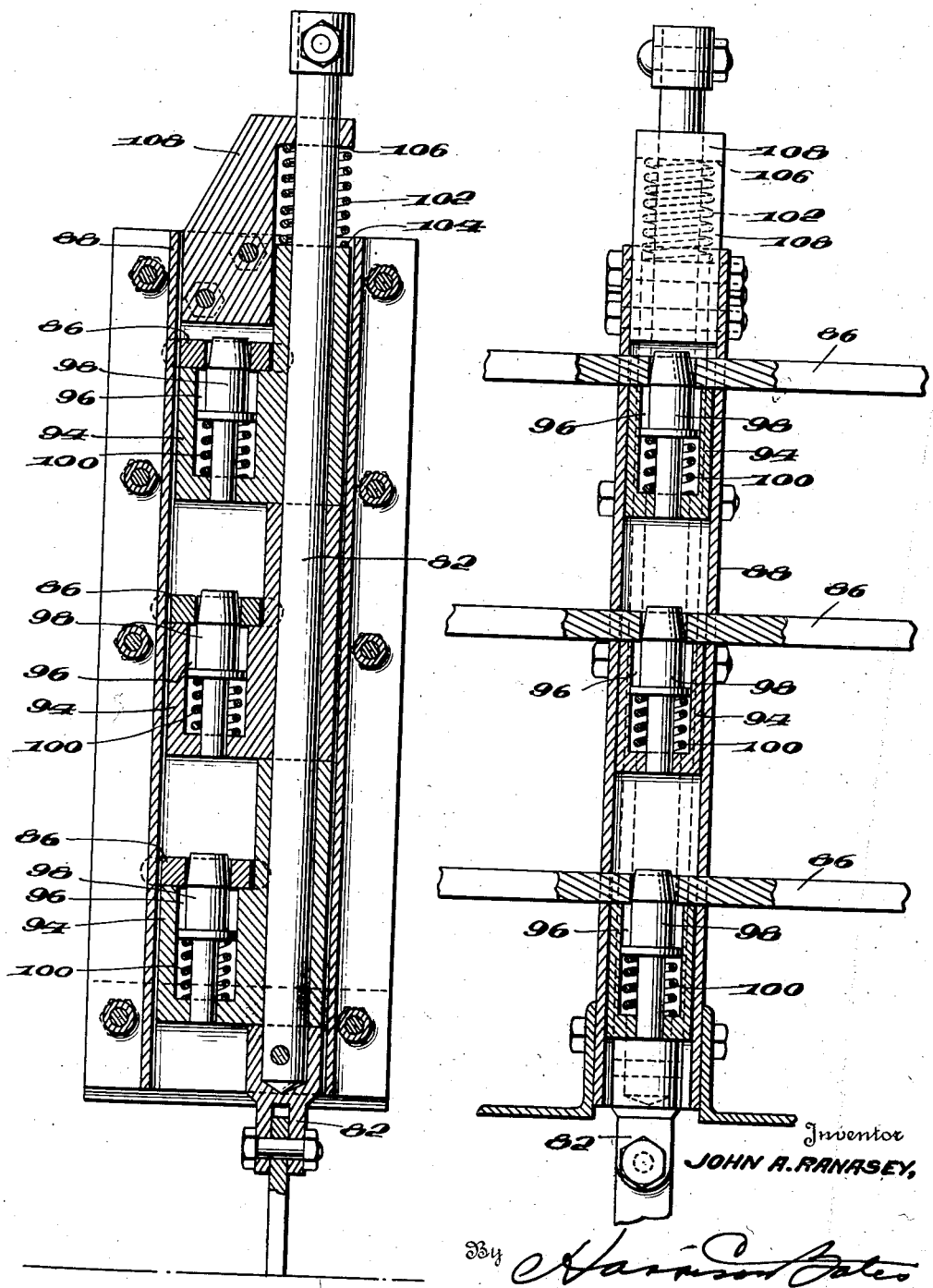

Patented Oct. 28, 1941

2,260,481

UNITED STATES PATENT OFFICE 2,260,481

AIRCRAFT CONSTRUCTION

John A. Ranasey, Baltimore, Md., assignor to The Glenn L. Martin Company, Baltimore, Md.

Application October 21, 1939, Serial No. 300,547

6 Claims. (Cl. 244—83)

This invention relates to mechanism for locking the wheel brakes and the surface controls of an airplane to prevent the airplane from being damaged when parked in the open.

It is not an infrequent occurrence that airplanes parked in the open are blown or will roll into objects, thus becoming damaged. It is the principal object of the invention to prevent this. To accomplish this end, mechanism is provided for locking the wheel brakes. Mechanism is also provided for locking the control surfaces of the airplane in a predetermined position.

Moreover, the system employed is interconnected in such a manner that it is impossible to release the wheel brakes without simultaneously releasing the control locks. It is another object of the invention to provide a system which will operate in this manner.

The invention has for other objects the provision of mechanism for accomplishing the desired purposes and which is of simple construction, easy to operate and reliable in such operation, and which may be applied to airplanes already constructed and in use by making relatively few changes and additions.

Other objects of the invention will be more apparent from the following specification and claims when read on the accompanying drawing in which:

Fig. 1 is a schematic view in perspective of the invention;

Fig. 2 is a detail view in perspective of a part of the mechanism for locking the wheel brakes, Fig. 3 is a side elevation of a part of the mechanism for locking the wheel brakes.

Fig. 4 is a plan view of the mechanism shown in Fig. 3;

Fig. 5 is a side elevation view of the control surfaces locking mechanism;

Fig. 6 is an elevation view of the control surfaces locking mechanism taken at right angles to the view of Fig. 5;

Fig. 7 is a cross section of the control surfaces locking mechanism shown in Fig. 5; and Fig. 8 is a cross section of the control surfaces locking mechanism as shown in Fig. 6.

Referring specifically now to Fig. 1, the wheel brakes (not shown) are operated through a hydraulic valve generally indicated by the reference character A. The operation is effected by depressing the brake pedals 2 and 4. Through the levers 6 and the rods 8 and 10 this results in turning the torque shafts 12 in the direction of the arrows.

The partial rotation of the torque shafts 12 results, through the rods 14, in pushing the lower ends of the members 16 in the direction of the arrows. This, in turn, through mechanism to be described, actuates the valve members 18 of the hydraulic valve A. The valve then distributes oil or other fluid under pressure through the pipe lines 20 to each wheel brake. The return pipes from the wheel brakes to the hydraulic valve are indicated by the reference numerals 22. Through a reverse action of the parts, releasing the brake pedals operates the hydraulic valve to release the wheel brakes.

The co-pilot may also be provided with a hand brake 24 which, when operated, acts through the cable 26, passing over pulleys such as 28 and 30, to actuate the members 16 and consequently the hydraulic valve A and the wheel brakes.

The hydraulic brake system just described is more or less conventional. However, according to the present invention that system is operatively connected with means for locking the brakes in braked position and also with means for locking the control surfaces of the airplane in a predetermined position. Moreover, these means are so inter-connected that it is impossible to release the wheel brakes without releasing the control surfaces from their locked position. This is accomplished by mechanism which will now be described.

In the cockpit is a parking brake hand lever 32 which is connected by means of a rod 34 to an arm 36 secured rigidly to a shaft 38 so that upon movement of the lever 32 to the dotted line position the shaft 38 is turned in a clockwise direction. The shaft 38 has another arm 40 secured thereto and this arm 40 is connected by means of the rod 42 to an arm 44 on the shaft 46, so that upon operation of the parking brake hand lever 32 as described, the shaft 46 will be moved in a counter-clockwise direction, as indicated by the arrow.

As shown more clearly in Fig. 2, the shaft 46 has a flat pawl member 48 rigidly secured thereto at the end near the hydraulic valve A. The pawl member 48 is adapted to engage individual ratchets 50 cut in the members 16.

Each member 16 has two upstanding elements 54 and 55 rigid therewith. The elements 55 are rigidly secured as at 56 to yoke members 57 which in turn are pivoted to the housing of the valve A as at 58. The lower ends of the members 16 are connected to the rods 14, so that when the rods 14 are moved in the direction of the arrows the members 16 together with the elements 54 and 55 and the yokes 57 will all be moved counterclockwise about the pivot points 58 thus causing the elements 54 to move the valve member 18 to operate the hydraulic valve A. Ball and socket connections are provided as at 51 and 53.

The pawl member 48 can only engage the individual ratchets 50 when the parking brake is operated and the brake pedals have been depressed. It then acts to retain the brake pedals in depressed position so that the wheel brakes are locked in braked position. When the brakes are released the pawl member 48 is returned to inoperative position through the action of the spring 60 which draws it downwardly, thus turning the shaft 46 in a clockwise direction returning the parking brake hand lever 32 to its normal position (shown in full lines in Fig. 1).

The invention, as indicated, also contemplates and includes mechanism for locking the control surfaces, which mechanism is connected with the parking brake hand lever 32. This mechanism, indicated generally by the reference character B in Fig. 1, is shown in detail in Figs. 5, 6, 7 and 8.

The shaft 38, movement of which is controlled by the parking lever 32, has a transverse bar 62 secured thereto, to the ends of which are secured cables 64 and 66. These cables pass over pulleys 68 and then cross each other and are connected to opposite ends of an intermediately pivoted bar 70. This bar 70 is mounted on a sleeve 72 (Fig. 5) rotatable on a shaft 74 rigidly held by the brackets 76.

Secured rigidly to the bar 70 so as to move therewith, is an arm 78 which in turn is pivoted to a link 80 pivotally connected to the locking shaft 82.

The operation of this part of the arrangement is as follows: Operation of the parking hand lever 32 will rock the transverse bar 62 and through the cables 64, 66 will move the bar 70 counter-clockwise about its pivot point 71. This action will result in an upward movement of the locking shaft 82 through the arm 78 and the link 80. Movement of the locking shaft 82 upwardly locks the control surfaces through mechanism which will now be described.

The control surfaces of the airplane have cables 84 extending therefrom. Disposed in each cable line is a flat lock bar 86. There is one bar corresponding to each control surface, namely, elevator, rudder and aileron. These lock bars, as the control surfaces are moved, are adapted to move through the housing 88, provided for that purpose with suitable openings 90. Each of the lock bars 86 is provided with a central aperture and these apertures are in vertical alignment within the housing 88 when the control surfaces of the airplane are all in the desired position for locking.

As will be noted from Figs. 7 and 8, the locking shaft 82 is slidable vertically within the housing 88. The locking shaft 82 has three laterally projecting lugs 94 rigid therewith. Each of these lugs is provided with a vertical cylindrical bore 96. These cylindrical bores house locking pins 98 which are urged upwardly by springs 100. The upper ends of the locking pins are frusto conical in shape. The lower ends of the locking pins are of smaller diameter and pass through restricted parts of the bores in the bottom of the lugs.

The lugs and their locking pins are disposed so as to be in vertical alignment with the openings in the lock bars 86 when the control surfaces are all in predetermined position for locking. When the locking shaft 82 is then moved upwardly in the manner already described, the lock pins 98 enter the openings in the lock bars 86, thus locking the control surfaces in said predetermined position.

If the control surfaces are not exactly in the predetermined position at the time the locking shaft 82 is raised, the locking pins 98 will engage the lower surfaces of the lock bars 86 and the locking pins will be depressed in their bores against the action of the springs 100. Shaking the controls for aileron, rudder and elevator around said predetermined position will soon result in disposing the respective individual lock bars so that each locking pin 98 will enter the opening in its respective lock bar. As soon as all three of the locking pins have engaged their corresponding openings in the lock bars, it will no longer be possible to shake the controls for aileron, rudder and elevator, and the pilot will know that the controls are then locked in the predetermined position.

Upward movement of the locking shaft 82 is resisted by the spring 102 which bears against the shoulder 104 on the locking shaft 82 at one end and at the other end against a shoulder 106 on a bracket 108 secured to the housing 88. The upper end of the locking shaft 82 passes through an opening in the shoulder 106.

Downward movement of the locking shaft 82 is aided by the spring 102, after the parking brake hand lever 32 has been restored to neutral position as shown in full lines in Fig. 1. Such action, through the shaft 38, the transverse bar 62 and the cables 64, 66, moves the bar 70 in a clockwise direction about its pivot point 71, thus cooperating with the spring 102 to move the locking shaft 82 downwardly in the housing 88. This, of course, removes the pins 98 from the openings in the lock bars 86 so that the control surfaces may again be actuated.

However, the arrangement is such that the unlocking of the control surfaces cannot take place until the wheel brakes are released, or such that the wheel brakes cannot be released without simultaneously releasing the control surfaces.

The simultaneous release of the wheel brakes is effected by depressing the brake pedals 2 and 4 farther until the individual ratchets 50 release the pawl 48 on the shaft 46. The pawl 48 when released is drawn downwardly by the spring 60 (Figs. 1 and 2), thus turning the shaft 46 clockwise. This turns the shaft 38 in a counter-clockwise direction restoring the parking brake hand lever 32 to full line position. At the same time, through the cables 64, 66 and the pivoted bar 70, the locking shaft 82 is drawn downwardly (aided by the spring 102), thus releasing the lock bars 86 from locked position.

Briefly then, in normal braking operations, when taxiing or coming to a complete stop, the brake pedals operate the hydraulic valve A which distributes oil under pressure to each wheel brake. When parking the airplane in the open, the brakes and the control surfaces may be locked by first depressing both brake pedals equally, and, secondly, by pulling back on the parking brake hand lever in the cockpit. This automatically brings the lock for the control surfaces into operation. By pushing the control column and actuating the aileron control wheel and rudder pedals (not shown) to predetermined positions suitable for locking, the lock pins in the control lock will then automatically engage with the lock bars corresponding to each surface. To release the parking brake, both brake pedals are depressed farther until the ratchets are released. This will automatically release the control surfaces lock, but the arrangement is such that it is impossible to release the wheel brakes without releasing the lock for the control surfaces.

Obviously, changes may be made in the structure described without departing from the invention, which is not to be limited except as indicated by the appended claims.

I claim:

1. In an airplane having wheel brakes, brake pedals for actuating said brakes, a ratchet the position of which is controlled by said brake pedals, control surfaces locking means comprising members having apertures therein adapted to align when the control surfaces are in neutral position, a member adapted to engage said apertures when they are in alignment, and an operating member for actuating said last named member to lock the control surfaces in predetermined position, a pawl controlled by said operating member to be engaged by said ratchet when locking said control surfaces to lock said brakes in braked position, the normal position of said pawl being out of the path of movement of said ratchet during normal braking operations when said control surfaces are unlocked.

2. In an airplane having wheel brakes adapted to be operated through hydraulic pressure, a hydraulic valve having valve operating means, members adapted when moved to actuate said operating means, brake pedals, linkage means connecting said brake pedals and said members to move said members when said brake pedals are depressed, said members having ratchet portions, a pawl adapted to engage said ratchet portions, means controlled from the cockpit for moving said pawl into engagement with said ratchet portions only when said brake pedals have been depressed to lock the brakes in braked position, and control surfaces lock means interconnected with said last mentioned means to lock the control surfaces in predetermined position.

3. In an airplane having wheel brakes, means for locking said brakes in braked position, means controlled from the cockpit for selectively actuating said locking means, and means interconnected with said means controlled from the cockpit for locking the control surfaces of the airplane in predetermined position, said last named means comprising lock bars in the cable lines to the control surfaces, a housing having openings therein through which the lock bars pass, said lock bars each having an aperture therein, which apertures are in alignment with in the housing when the control surfaces are in said predetermined position, a shaft within the housing and mounted for sliding movement, said shaft having lateral lugs thereon, spring-pressed lock pins carried by said lugs and adapted to enter the apertures in said lock bars when the control surfaces are in said predetermined position to lock said surfaces in said position.

4. In an airplane having wheel brakes, means for locking said brakes in braked position, means controlled from the cockpit for selectively actuating said locking means, and means interconnected with said means controlled from the cockpit for locking the control surfaces of the airplane in predetermined position, said last named means comprising lock bars in the cable lines to the control surfaces, a housing having openings therein through which the lock bars pass, said lock bars each having an aperture therein, which apertures are in alignment within the housing when the control surfaces are in said predetermined position, a shaft within the housing and mounted for sliding movement, said shaft having lateral lugs thereon, spring-pressed lock pins carried by said lugs and adapted to enter the apertures in said lock bars when the control surfaces are in said predetermined position to lock said surfaces in said position, the interconnection between said means comprising a bar adapted to rock about a central axis when actuated by the means controlled from the cockpit, a second bar adapted to rock about a central axis, cables connecting said bars to transmit movement of the first bar to the second, and means connecting said second bar to said shaft to actuate said shaft.

5. In an airplane having wheel brakes, means for actuating said wheel brakes, means settable for locking the control surfaces against any movement in an aerodynamically neutral position after they have been placed in such position, locking means operable by movement of said settable means when said wheel brake actuating means have been actuated for locking the wheel brake actuating means in braking position, and means for preventing operation of said locking means until said wheel brake actuating means have been actuated.

6. In an airplane having wheel brakes, means for actuating said wheel brakes, means settable for locking the control surfaces in a predetermined position after they have been placed in such position, common means operable only when said wheel brakes have been actuated for simultaneously locking the wheel brakes in braked position and setting said settable means in operative position, and means independent of said brake actuating means and said settable means for releasing said locking means.

JOHN A. RANASEY.